United States Patent [19]

Witkin

[11] Patent Number: 5,351,416
[45] Date of Patent: Oct. 4, 1994

[54] CLEAN AIR OVEN WITH HEAT RECOVERY AND METHOD

[75] Inventor: Philip M. Witkin, Greenville, S.C.

[73] Assignee: Marshall and Williams Company, Providence, R.I.

[21] Appl. No.: 76,455

[22] Filed: Jun. 14, 1993

Related U.S. Application Data

[63] Continuation-in-part of Ser. No. 24,823, Mar. 1, 1993, abandoned, which is a continuation of Ser. No. 785,691, Oct. 31, 1991, abandoned.

[51] Int. Cl.⁵ .............................................. F26B 21/06
[52] U.S. Cl. ................................................. 34/79; 34/86
[58] Field of Search ................... 34/79, 155, 156, 160, 34/158, 86, 35

[56] References Cited

U.S. PATENT DOCUMENTS 4,726,124  2/1988  Freiberg ........................... 34/79 X
5,001,845  3/1991  Norz et al. ....................... 34/79 X

*Primary Examiner*—Henry A. Bennet
*Attorney, Agent, or Firm*—Ralph Bailey

[57] ABSTRACT

An oven for treating a moving web has, within each zone (A), an incinerator (C) with a long holding period for receiving combustion products directly from a burner (B) and mixing them with process exhaust air from nozzles applying heated air to the web, and passing the products of the incinerator to a heat exchanger (E) for heating air from the nozzles prior to return of the heated air thereto.

7 Claims, 5 Drawing Sheets

CLEAN AIR OVEN WITH HEAT RECOVERY AND METHOD

This application is a continuation-in-part of application Ser. No. 08/024,823, filed Mar. 1, 1993 now abandoned, which is a continuation of application Ser. No. 07/785,691, filed Oct. 31, 1991, now abandoned.

BACKGROUND OF THE INVENTION

This invention relates to an improved apparatus and method for treating a moving web including textile and plastic webs with heated air by, in at least one oven zone, passing all of that zone's process air through a heat exchanger and discharging a portion thereof directly into an incinerator providing a source of heated air for the heat exchanger. Such portion is also cleaned by the incinerator and exhausted to atmosphere.

Common pollutants which are in the process air which should be removed are volatile organic chemicals, including knitting oils and other finishes and impurities related to textile, plastic and other webs or other being treated.

Heretofore, oven exhaust has been cleaned of pollutants by either central precipitators, scrubbers or incinerators external to the oven.

Precipitators and scrubbers have been difficult to maintain. The polluted air must be cooled, with the result that the pollutants condense in the air stream and onto any of the cooler surfaces. These contaminated surfaces must subsequently be cleaned and the condensed pollutants disposed of.

Central incinerators have been expensive to manufacture and install, and to operate. To reclaim the heat from the incinerated air stream, the heated air or water heated by an air to fluid heat exchanger, must be used in the plant. Frequently, excess heat may be produced and is wasted. Furthermore, if heated air is reintroduced into a well-balanced oven, that oven may require additional exhaust to maintain a balance with the room air. This added exhaust volume in turn increases the energy consumption and operating cost of the oven.

Prior attempts to solve the problems contemplated a heat exchanger and incineration system, both located externally to the oven. Subsequently, attempts were made in which exhaust air was passed through a burner and heat exchanger to heat circulating air. However, in this latter case, no attempt was made at incineration.

Accordingly, it is an important object of this invention to eliminate these problems by providing an incineration system which will be an integral part of the oven and whose heat will be used to heat the oven's circulating air, sometimes referred to as process air, all of which passes through a heat exchanger in a constant path back to the nozzles.

An important advantage of the invention resides in a reduction in energy consumption because no substantial amount of makeup air is added to the oven due to the incineration and heat exchanger system hereof and because most components are inside the oven where any heat lost is recaptured in the process. Further, as a result of controlling process temperature first by controlling the incineration temperature and then by utilizing a bypass carrying a portion of incinerated air past the heat exchanger should the process result in the incineration temperature falling below a predetermined temperature, the exhaust temperature and exhaust volume are minimized. Thus, energy costs are minimized.

As a further advantage, maintenance costs will be reduced since only clean incinerated air will enter one path of the heat exchanger. The system is easy to install since it is a modular part of the oven. Insulation will not be required for the incinerator, and insulation cost for the exhaust duct will be minimized since the exhaust temperature of exhaust air will have been reduced well below the its temperature upon incineration. Air entering the heat exchanger may be readily filtered.

Apparatus and method in accordance with the invention may be utilized with and adapted to a variety of ovens constructions including those illustrated in U.S. Pat. Nos. 4,295,284, 4,341,024 and 4,435,909.

SUMMARY OF THE INVENTION

It has been found that an internal incinerator may be made an integral part of any zone, stage or module of a multi zone oven. The incinerator's heated air is passed into a heat exchanger through which all of the oven's recirculating process air passes. The incinerator provides an extended holding period for the combustion products of a burner and exhaust process air, permitting more nearly complete incineration of the pollutants in the air stream, by using one or more incinerator tubes carried in a central duct of an oven module. At any such zone of the oven the combustion gases from the burner provide heat for cleaning exhaust process gases in the incinerator. A bypass is provided for incinerated air which would normally be used in the process should the incinerator temperature fall below a predetermined minimum. A special configuration for the heat exchanger results in further savings in material costs.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
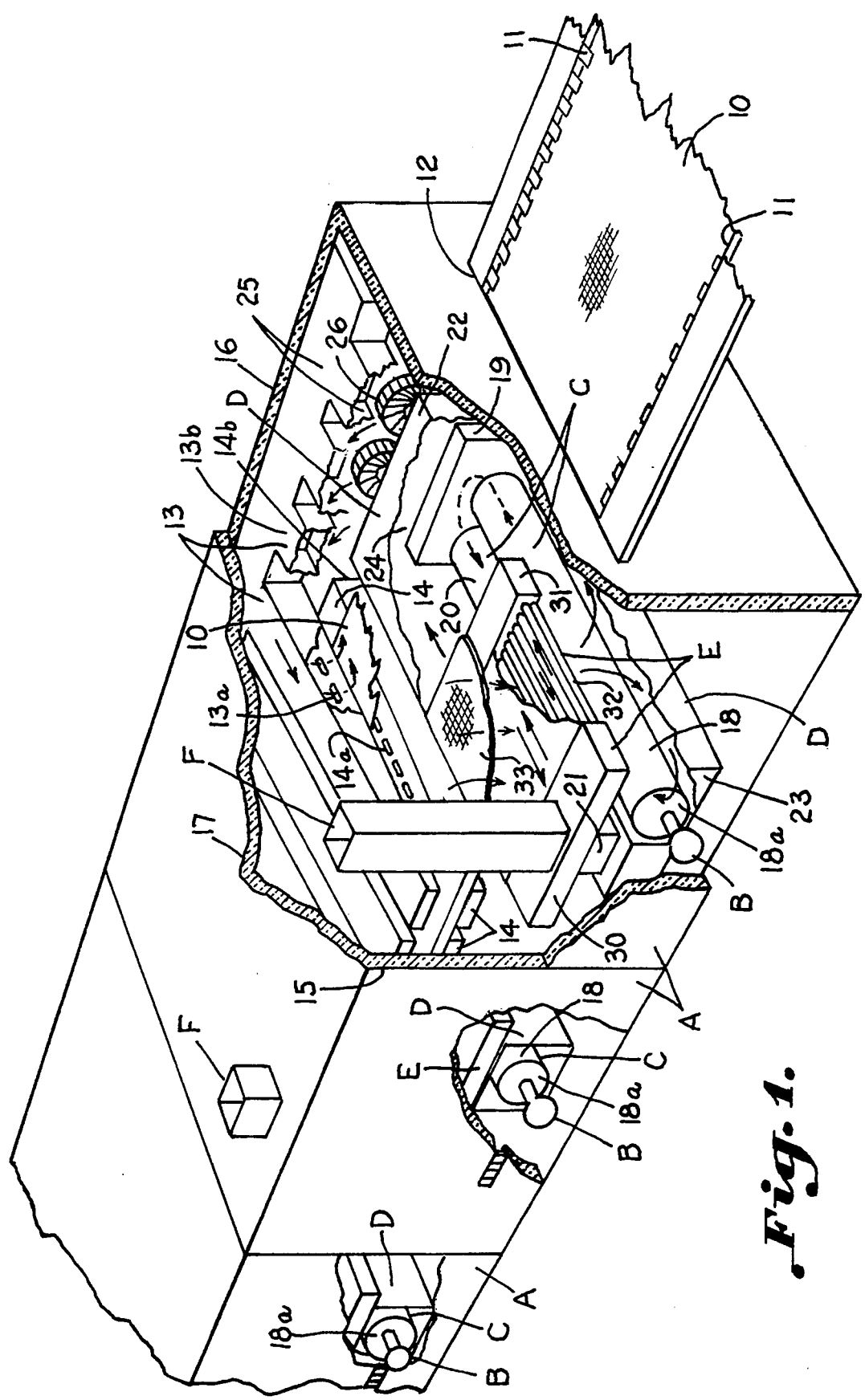
FIG. 1 is a perspective view of a tenter range looking toward the left front corner, illustrating an air flow path through an incinerator and a heat exchanger arranged within each oven zone or section; constructed and carried out in accordance with a preferred embodiment of the invention.

Since each oven zone may have its own independent incineration system, the construction may be modular with simple design requirements. The system is schematically shown in the drawings. A burner heats a portion of the process air to a high temperature suitable for destroying pollutants. An incinerator tube of a sufficient size and length is provided to allow time for the pollutants to be incinerated. A heat exchanger is provided through which the now clean and hot incinerated air passes to heat all of the process air used for process heating. An exhaust system is also illustrated.

Oven process temperature can be controlled by modulating the incineration temperature over a predetermined range and by bypassing some modulated portion of the incinerated air past the heat exchanger should the incineration temperature fall too low.

An incinerator and heat exchanger are arranged in an oven zone in such a way that oven process air can be cleaned by incineration by a burner and then used for process heating by means of the heat exchanger which serves as a constant path through which all of the process air passes. The incineration portion of the system provides a substantial dwell time during which the exhaust gasses are held at the required incineration temperature.

The drawings illustrate an oven in the form of a tenter range for applying heated air to a moving web through nozzles spaced across the web. A plurality of zones each have a housing A including insulated walls. A burner B is positioned within each of the insulated housings. An elongated incinerator C is carried within each of the insulated housings receiving combustion gases from the burner and mixing them with process exhaust air. Elongated ducts D, carried within the insulated housings, contain the incinerators. A heat exchanger E is carried in each of the ducts receiving the combustion products and incinerated exhaust gases and transferring heat to process air which will subsequently pass through the nozzles and onto the web being treated. The elongated duct D conveys heated gases from the heat exchanger to the nozzles. An exhaust F permits air to pass from the heat exchanger out of the housings. Preferably the incinerators each include a plurality of elongated aligned tubes, one bank of the tubes receiving combustion gases and incinerated exhaust gases and discharging same into an opposite end of another bank of the tubes prior to being exhausted from the housing.

Referring more particularly to FIG. 1, a web 10 is carried into a multi zone oven to be treated by heated air. The web 10 is illustrated schematically as passing through the entrance opening 12 and thence between nozzle plenums 13 and 14 having openings 13b and 14b for receiving heated air from fans 26 for applying heated air above and below respectively across the web 10 through openings, shown as holes 13a and 13b.

Each of the zones includes an insulated housing A. The housings A include suitable insulated side walls 15 and 16 and a top wall 17. A burner B is carried in a wall 15 and if necessary a grate may be located at a suitable place in the oven wall to allow some air to enter the oven. The burner B discharges directly into an open end 18a of a first holding tube 18 of an incinerator C. Exhaust process air is illustrated by arrows as passing into the open end 18a. The incinerator C includes a first tube 18 which discharges partially incinerated air into a header 19 from whence it passes to a second holding tube 20. The incinerated air passes from an opposite end of the holding tube 20, through duct work 21 to a heat exchanger E.

The elongated tubes 18 and 20 of the incinerator C need not be insulated and thereby utilize the heat from the incinerated air to further heat the recirculating air flowing thereover.

The heat exchanger E is illustrated as being carried in an upper wall 22 of the elongated duct D which also houses the incinerator C. The ducts D have end walls 23 on one end and are open on the other end as at 24 for air flow into a duct 25 for recirculation of heated air from the heat exchanger E into the nozzle plenums 13 and 14. The ducts 25 contain suitable fans 26 and recirculate air into the open ends 13b and 14b of the nozzle plenums. This constant air flow path results in predictable air flow to the nozzles and hence constant process heating and a stable web.

Figure 2:
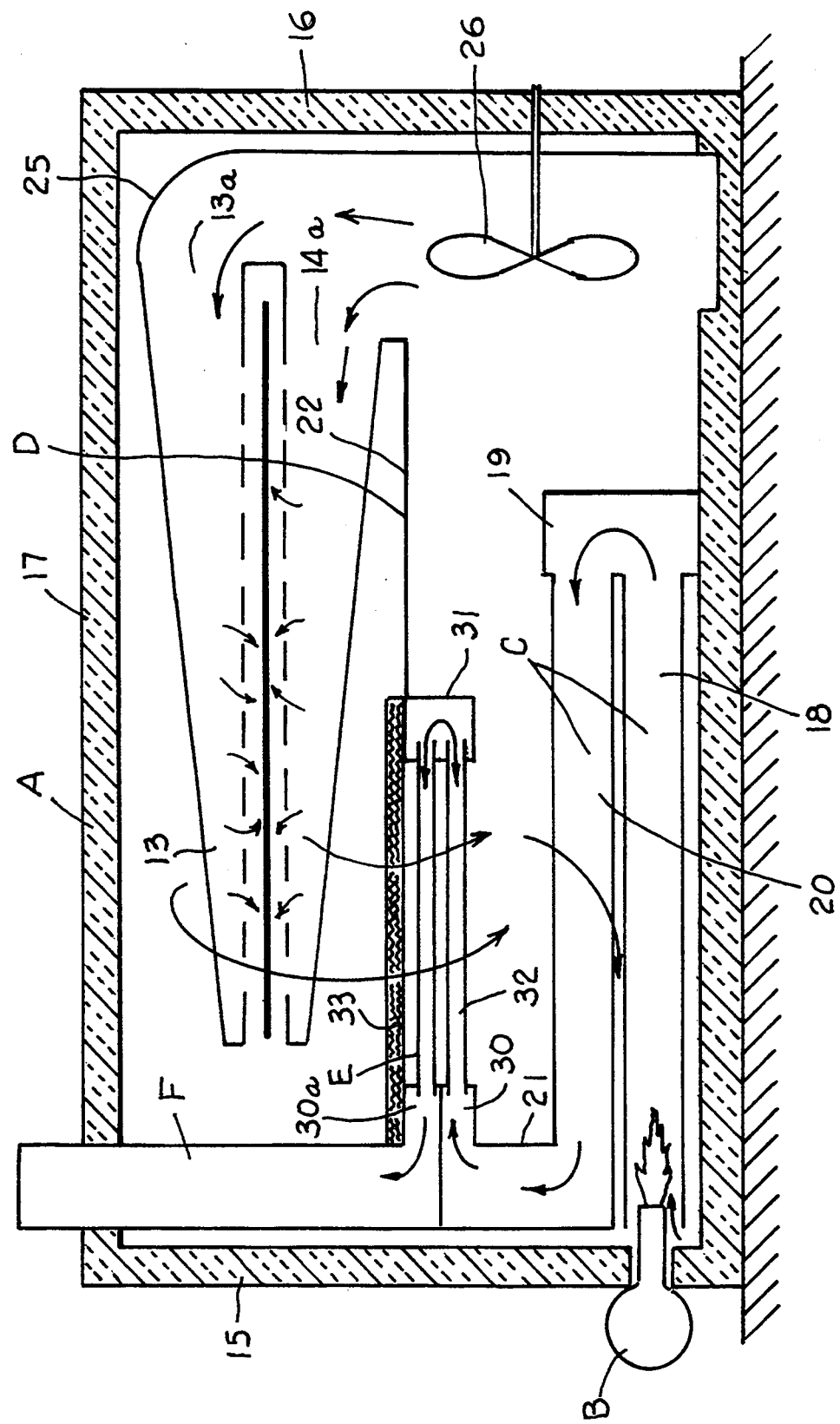
FIG. 2 is a transverse sectional elevation through a tenter range illustrating apparatus constructed in accordance with a modified form of the invention wherein a plurality of tubes included in the incinerator are stacked in vertical relation.
Figure 5:
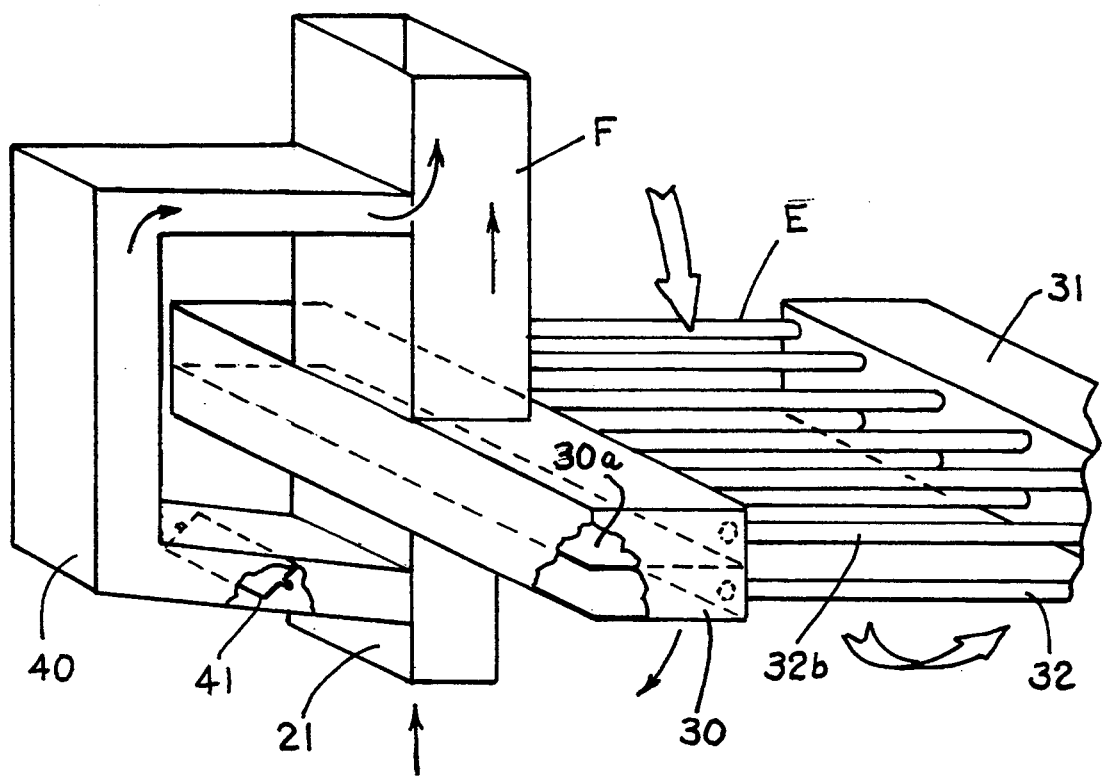
FIG. 5 is a perspective view illustrating a bypass for incinerated air around the heat exchanger.

FIGS. 1, 2 and 5 illustrate the heat exchangers E which are carried in the upper wall 22 of the elongated ducts D. The heat exchangers E have headers 30 and 31 on each end with tubes 32 for conveying incinerated gases received in the header 30 from the duct work 21 (FIGS. 1 and 2). The headers 30 are shown as having horizontal partitions 30a which cause the hot incinerator gases to flow first through the tubes 32 and then upwardly thereover through the exhaust duct F. Thus, exhaust gases from the incinerator C may be passed to the exhaust F. Circulating process air flows from the nozzles 13a and 14a through the filter 33 and thence through the heat exchanger E into the elongated duct D. That portion of process air which enters the incinerator C, rather than flowing to the nozzles, may be referred to as process exhaust air.

The tubes 32 have a lower run or set of tubes 32a (FIG. 5) which first receive incinerated air and an upper run or set of tubes 32b, subsequently receiving the air. The process air passes first over the upper tubes 32b before passing over the lower tubes 32a, while the incinerated air passes through tubes 32a before entering the tubes 32b. Since the upper tubes 32b carry incinerated air that has been cooled, the tubes 32b are thus cooled more than the tubes 32a. Therefore, a less expensive material may be chosen for tubes 32b. Thus, material costs are reduced by virtue of having such a heat exchanger configuration.

FIG. 5 also illustrates a bypass for some of the incinerated air. If the process load is reduced to the point that the incineration temperature required to satisfy it is too low for effectively incinerating the exhaust, a portion of the incinerated exhaust may bypass the heat exchanger through the bypass duct 40. The minimum incineration temperature may be suitably set by the operator. With the bypass valve 41 closed, the incineration temperature will vary between a minimum setting and the maximum allowed by the heat exchanger E and incinerator C. However, if the incineration temperature is reduced to the set minimum, the oven temperature is controlled by modulating the bypass valve 41 while the burner holds the incineration temperature at the minimum set value. Thus, the incineration temperature is never higher than necessary, as required for process heating, and the amount of incinerated air bypassing the incinerator is the minimum needed for the incineration temperature to be held at or above the minimum value required for destruction of the pollutants. As a consequence, energy consumption is minimized.

Figure 4:
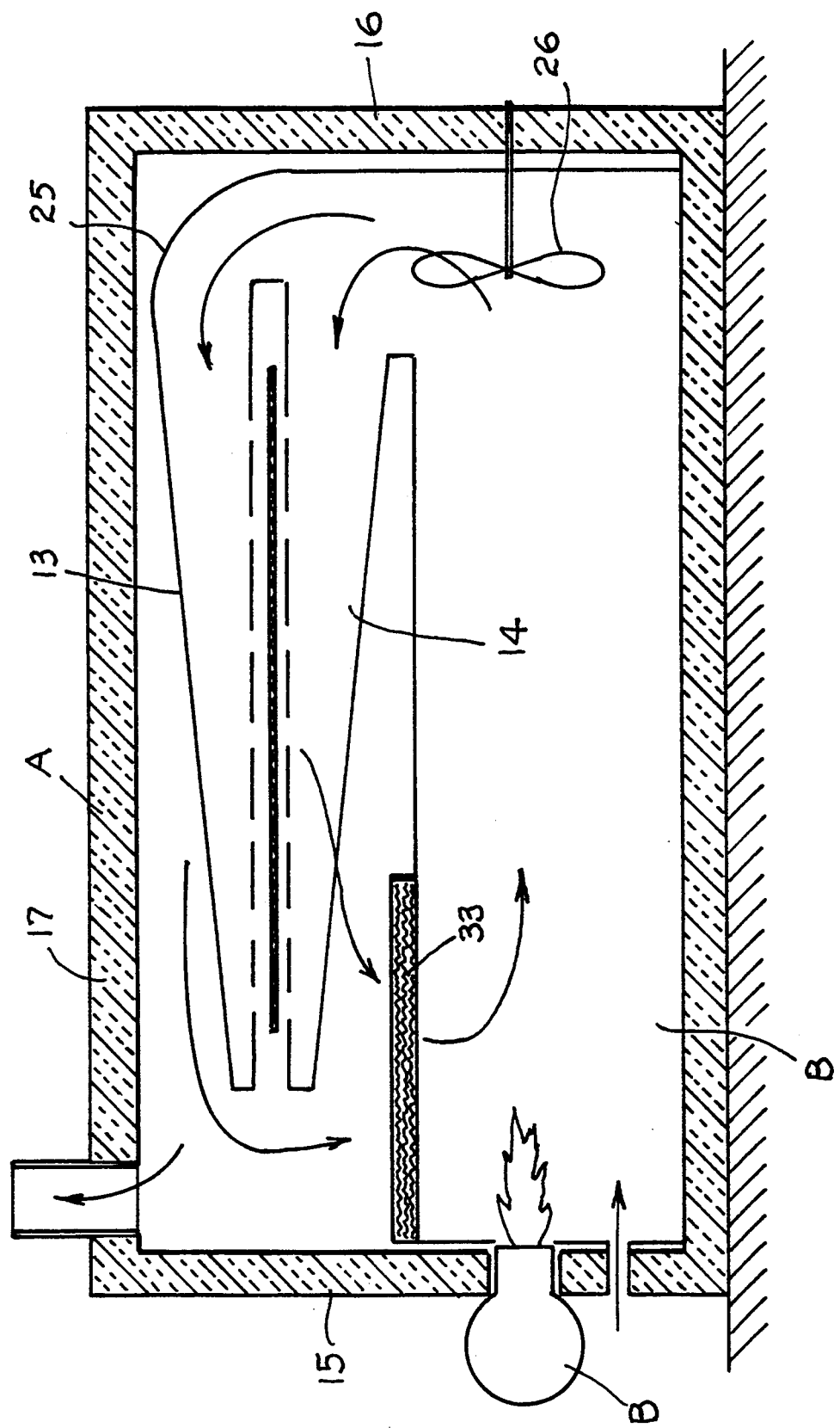
FIG. 4 is a schematic transverse sectional elevation through a tenter range illustrating an air flow path for treating a moving web in accordance with the prior art.

By contrast, FIG. 4 illustrates the air flow in ranges which are in common use. The burner B in each insulated housing D discharges into an elongated duct D from whence fans 26 move the air through the duct 25 to the nozzle plenums 13 and 14. A portion of the process air is recirculated through the filters 33 into the duct D.

FIG. 2 also illustrates a modified form of the invention in which the holding tubes 18 and 20 are in vertically stacked relation.

Figure 3:
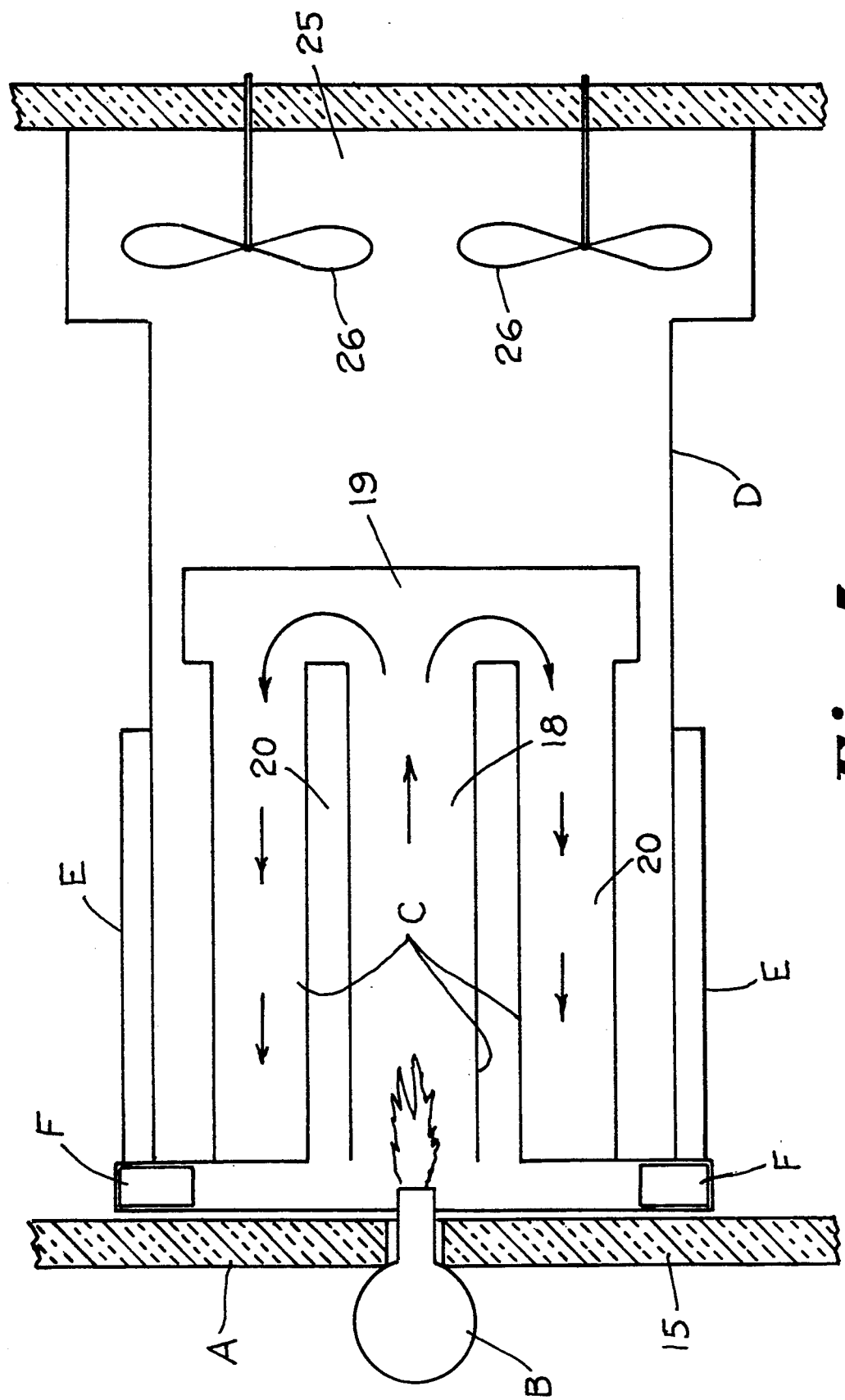
FIG. 3 is a sectional plan view illustrating another modified form of the invention wherein the incinerator includes a central tube with a tube on either side and a vertical heat exchanger on each side of the incinerator further illustrating that the heat exchanger and incinerator tubes may assume a variety of orientations.

FIG. 3 illustrates another modified form of the invention in which the holding tube 18 is provided as a central tube into which the burner B discharges flanked by holding tubes 20 in a horizontal plane as in FIG. 2. A heat exchanger is positioned vertically at each side in a vertical side wall of the elongated duct D.

Figure 6:
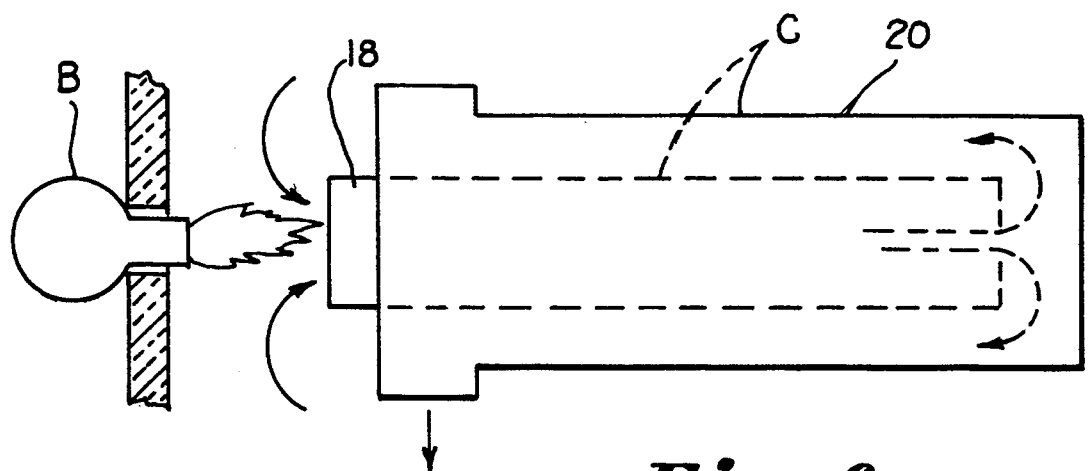
FIG. 6 is a schematic transverse sectional elevation illustrating a modified form of the invention wherein the incinerator includes concentric tubes.

The incinerator tubes C may be concentric or otherwise disposed within one another, with exhaust air first passing through an inner tube and then passing through the annulus or opening formed between the inner and outer tubes as schematically illustrated in FIG. 6.

It is thus seen that an incinerator and heat exchanger can be arranged in an oven zone in such a way that the oven exhaust can be incinerated and the incinerated exhaust then used for process heating by means of the heat exchanger. The incineration portion of the system is arranged in such a way that the discharge from the burner and the exhaust process air are contained providing a substantial dwell time during which the exhaust gases are held at the required incineration temperature can be achieved. Since the incinerator modules are entirely inside the oven enclosure, floor space is minimized with energy savings. Expensive insulated external ducts are avoided. Clean air is exhausted.

While a preferred embodiment of the invention has been described using specific terms, such description is for illustrative purposes only, and it is to be understood that changes and variations may be made without departing from the spirit or scope of the following claims.

What is claimed is:

1. An oven for applying heated air to a moving web through nozzles spaced across the web comprising:
   a plurality of zones each having an insulated housing;
   a burner positioned within said housings;
   an elongated incinerator carried in at least one of said housings receiving combustion gases from the burner and mixing them with process air;
   an elongated duct extending in said housing containing said incinerator;
   a heat exchanger in said duct receiving the combustion and exhaust products of said incinerator and forming a constant path through which all of said process air passes transferring heat to said process air passing from said nozzles and the web being treated preparatory to return of such process air to the nozzles;
   a bypass for directing a portion of the combustion and exhaust products of said incinerator around said heat exchanger;
   said duct conveying heated gases from said heat exchanger to said nozzles; and
   an exhaust for air to pass from said heat exchanger out of said housing.

2. The structure set forth in claim 1 wherein said incinerator includes a plurality of elongated aligned tubes, one of said tubes receiving combustion and exhaust gases and discharging same into an opposite end of another of said tubes.

3. The structure set forth in claim 2 wherein said tubes are in horizontal alignment.

4. The structure set forth in claim 2 wherein said tube are in vertical alignment.

5. The structure set forth in claim 2 wherein said tubes include a tube on each side of a tube into which said burner discharges combustion gases and exhaust gases and wherein an upright heat exchanger is on each side therewith in said duct.

6. The structure set forth in claim 2 wherein said tubes are carried one within the other.

7. The method of treating a moving web by applying heated air thereto through nozzles spaced across the web comprising the steps of:
   providing an oven having a plurality of zones at least one of which has a housing including insulated walls positioning a burner therein;
   providing an elongated duct carrying an elongated incinerator therein within said housing;
   passing combustion gases from the burner and mixing them with a portion of said process air in said elongated incinerator carried within said duct;
   setting the temperature of said incinerator to operate within a predetermined range;
   incinerating said process exhaust air by passing same through a plurality of elongated aligned tubes, receiving combustion and process exhaust gases from the burner in one of said tubes, and discharging same into an opposite end of another of said tubes for discharge into said heat exchanger prior to exhaust from said housing;
   providing a heat exchanger in said elongated duct receiving incinerated air and passing all process air therethrough to heat the process air passing from said nozzles and the web being treated preparatory to return of a remainder of said process air passing through said heat exchanger to the nozzles;
   controlling oven process temperature by bypassing a modulated portion of incinerated air past said heat exchanger; and
   exhausting air from said incinerator out of said housings.

* * * * *